United States Patent [19]

Fisher, III

[11] 4,258,567
[45] Mar. 31, 1981

[54] TIRE SIDEWALL DEFORMITY TESTER AND METHOD

[75] Inventor: Thomas W. Fisher, III, Akron, Ohio

[73] Assignee: The Firestone Tire & Rubber Company, Akron, Ohio

[21] Appl. No.: 79,401

[22] Filed: Sep. 27, 1979

[51] Int. Cl.³ .......................................... G01M 17/02
[52] U.S. Cl. ....................................................... 73/146
[58] Field of Search ................ 73/146; 33/174 P, 203, 33/203.11, 203.12

[56] References Cited

U.S. PATENT DOCUMENTS

| | | | |
|---|---|---|---|
| 3,303,571 | 2/1967 | Veals | 73/146 X |
| 3,490,277 | 1/1970 | Sanders et al. | 73/146 |

Primary Examiner—Jerry W. Myracle

[57] ABSTRACT

A device (10) which detects irregularities in the contour of sidewalls of a tire (T) includes transducer probes (29, 30) which are positioned by control systems (31, 40, 45) adjacent the sidewalls of the tire (T) to be tested. As the tire (T) is rotated the output signals of the transducer probes (29, 30), which are proportional to sidewall contour, are fed to a signal processing circuit (60) which provides an output signal indicative of an irregularity in the contour of a sidewall when an irregularity of a predetermined extent exists for a predetermined time period.

19 Claims, 4 Drawing Figures

TIRE SIDEWALL DEFORMITY TESTER AND METHOD

TECHNICAL FIELD

This invention relates to a method and apparatus for testing tires for sidewall deformities. More particularly, this invention relates to a device which will automatically check pneumatic tires for visually objectionable deformities in the sidewalls thereof.

BACKGROUND ART

For quite some time tire manufacturers have tested tires for performance characteristics on devices known as tire uniformity machines. Typically a tire is mounted and rotated and through the use of stain gauges or the like, certain force variations are measured. Such forces include radial force variations, lateral force variations and tangential force variations. These variations could cause poor riding characteristics in a tire and can often be corrected by a strategic grinding of material from an appropriate location on the tire.

These tire uniformity machines do not, however, detect variations or deformities which may be visually objectionable but which do not necessarily effect the performance of the tire. Such a deformity, such as a slight lump, depression or undulation in the sidewall of a tire, while not always effecting the performance or safety of the tire, are nevertheless objectionable in that the purchaser of the tire, in viewing the same, may feel that the tire is defective.

At the present time the only manner in which these slight defects are even attempted to be detected is manually. Either the laborer carefully visually checks every tire or else the tire is mounted and slowly rotated while the laborer places his finger lightly against the sidewall in an attempt to feel the defects. Due to the reliance on human senses, either of these procedures are highly subjective since tolerance levels cannot be clearly defined and in addition are variable between laborers and even the same laborer as fatigue and boredom take their toll. At the present time there is no known way to automatically test tires to detect these slight variations accurately.

DISCLOSURE OF THE INVENTION

It is therefore a primary object of the present invention to provide a method and apparatus which will automatically detect deformities of a predetermined extent in the sidewall of a tire.

It is another object of the present invention to provide a method and apparatus, as above, which will ignore normally occurring deformities such as pin vents, lettering and the like on the sidewall of a tire.

It is a further object of the present invention to provide a method and apparatus, as above, which is readily adaptable for use with other tire testing equipment thereby eliminating additional handling of the tire.

It is still another object of the present invention to provide a method and apparatus, as above, which will scan both sidewalls of a tire simultaneously for deformities thereon.

It is an additional object of the present invention to provide a method and apparatus, as above, which can scan a plurality of locations on each sidewall, as desired.

These and other objects of the present invention, which will become apparent from the description to follow, are accomplished by the structure and operation hereinafter described and claimed.

In general, a device which detects irregularities in the sidewall of a tire includes a transducer monitoring the contour of the sidewall and providing a signal proportional thereto. The transducer is positioned adjacent the sidewall and provides the signal to a signal processing circuit which acts on the input signal and provides an output signal when an irregularity of a predetermined extent is detected by the transducer. The output of the signal processing circuit is then received by an indicating device which provides an alert regarding the tire having the irregularity in a sidewall thereof.

PREFERRED EMBODIMENTS FOR CARRYING OUT THE INVENTION

Figure 1:
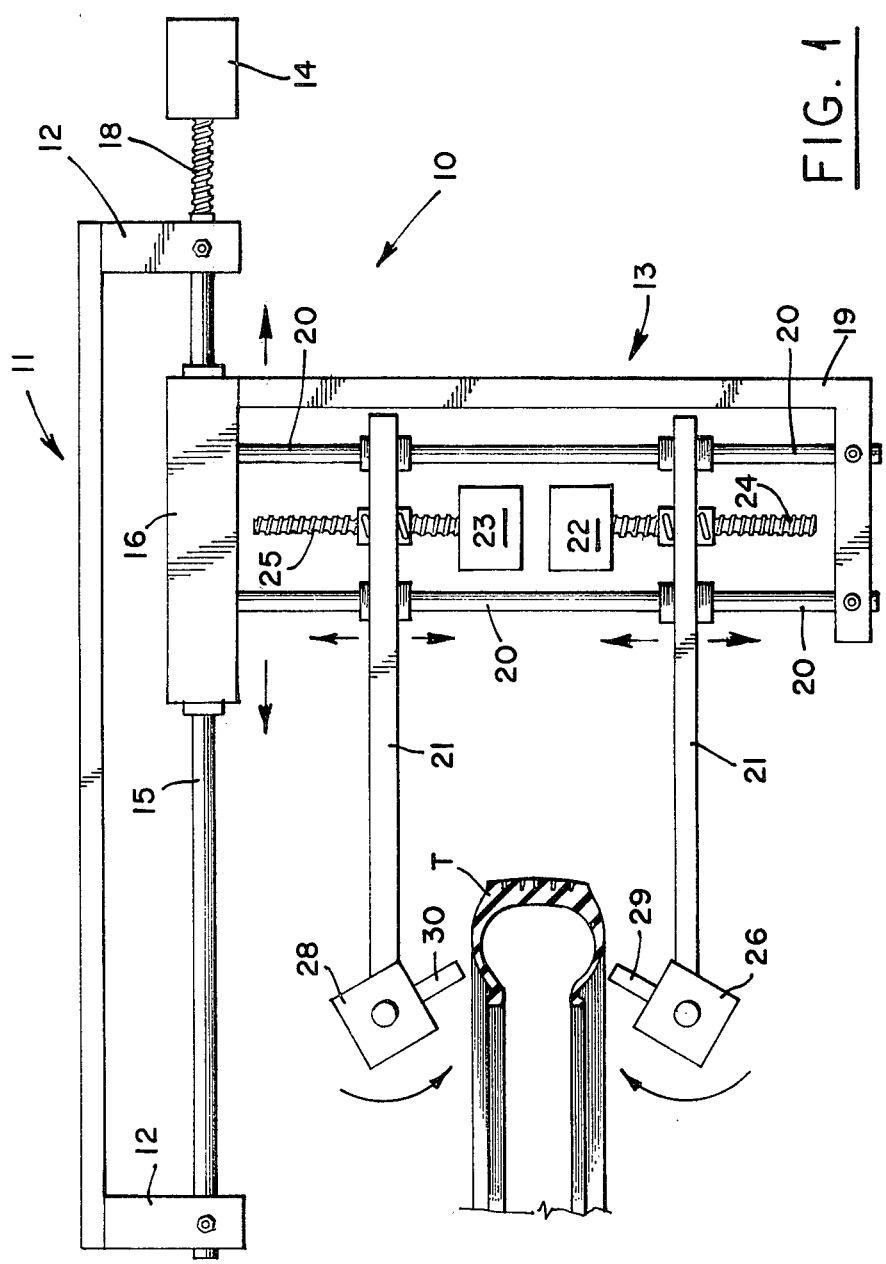
FIG. 1 is a somewhat schematic diagram of the mechanical features of the present invention showing in particular the manner in which the transducer is precisely positioned with respect to the tire.

The tire sidewall deformity detecting device is indicated generally by the numeral 10 in FIG. 1 and includes a generally U-shaped frame 11 having downwardly directed branches 12. Frame 11, between branches 12, is adapted for mounting on a conventional tire uniformity testing machine sometimes known in the industry as a TUO or TUG machine. Such machines are capable of mounting, inflating and rotating a tire T and thus present an ideal environment for the device 10. This is particularly true because most tire manufacturing facilities are equipped with TUO or TUG machines. The remaining description herein will assume that the device 10 is being utilized with such a machine. However, the device 10 would be totally operable with its own means to mount, inflate and rotate a tire T if that were necessary.

A probe carriage, indicated generally by the numeral 13, is movable radially of tire T by means of a radial stepping motor 14. Two ball shafts 15 (one shown) carry and guide a ball slide housing 16 which is screw driven, as at 18, in a conventional manner by motor 14. Thus, as motor 14 turns screw 18, housing 16 and thus carriage 13 move radially of tire T.

Housing 16 carries an L-shaped bracket 19 which supports two ball shafts 20 which carry and guide two probe arms 21. Two lateral stepping motors 22 and 23 drive screws 24 and 25, respectively, to independently move probe arms 21 laterally of tire T along ball shafts 20. Each arm 21 carries, at its outer end, a transducer probe assembly including a probe angle stepping motor 26 and 28 and probe or transducer 29 and 30, respectively. Transducers 29 and 30 are conventional noncontact displacement or proximity transducers such as manufactured by Mechanical Technology, Inc. of Latham, N.Y. as part of a system sold under the trademark Accumeasure System 1000. Motors 26 and 28 angularly position probes 29 and 30, respectively, so that the axis of the probes are approximately normal to a plane passing tangent through a point on the sidewall of tire T.

Figure 2:
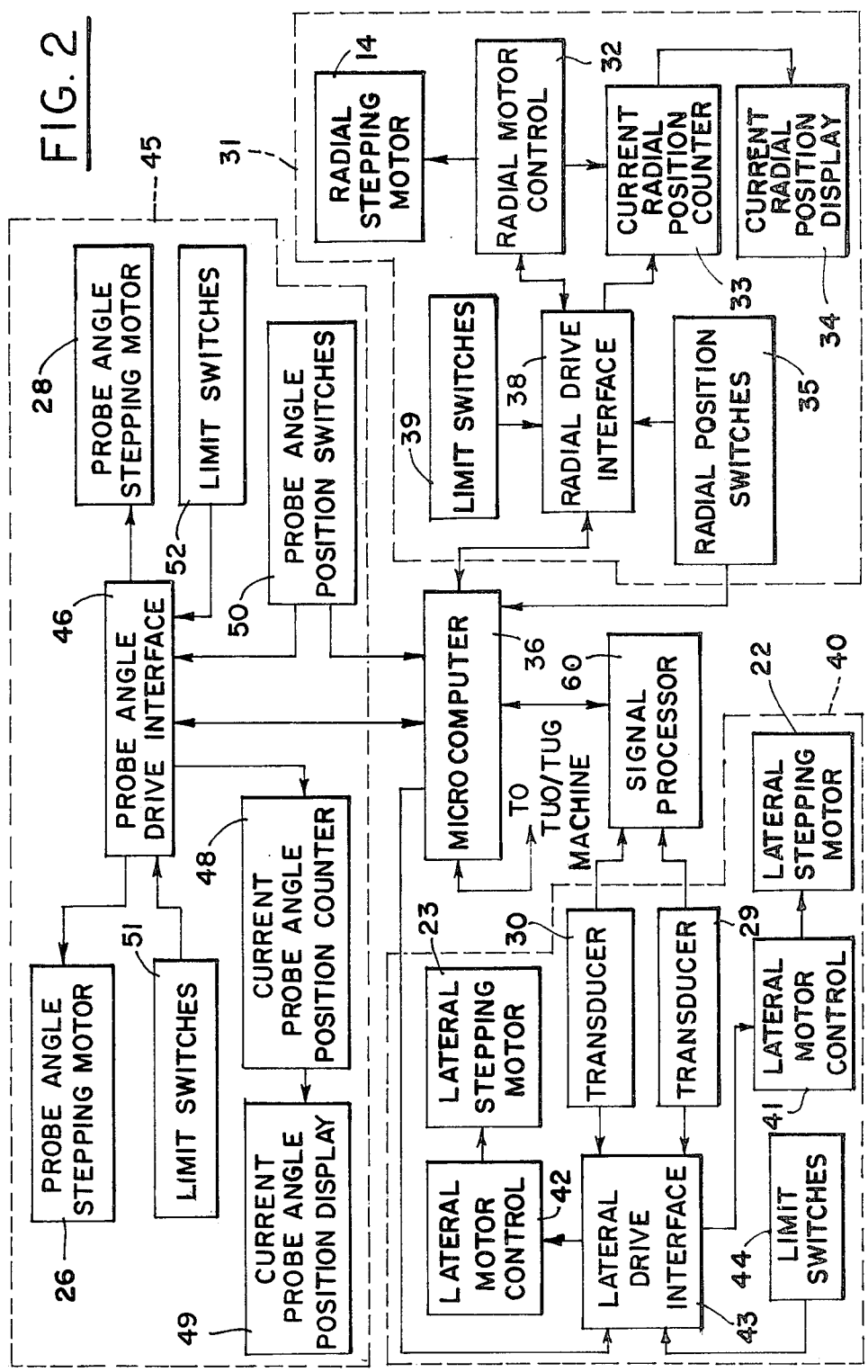
FIG. 2 is a block diagram showing the electronic features of the present invention.

The operation of the device shown in FIG. 1 is best explained with reference to FIG. 2. The radial stepping motor 14 which can be a Model M063-F006 stepping motor manufactured by Superior Electric Co., Bristol, Conn., is part of the main carriage radial position control subsystem indicated generally by the numeral 31. Motor 14 is controlled by a radial motor control circuit 32 which can be a device known in the art as a preset indexer such as a Model No. PIM-151 manufactured by Superior Electric Co., Bristol, Conn. Basically, circuit 32 operates motor 14 for a predetermined number of counts when directed to do so. The number of counts is initially determined prior to a run for a particular size tire by an operator who manually runs motor 14 until a desired radial position with respect to a tire is visually determined. The number of counts of motor travel is continually monitored by a conventional current radial position counter 33 and continually displayed on a conventional current radial position display 34 located on the control panel and observable by the operator. Once the operator has maually operated motor 14 to move carriage 13 to a desired radial position along the sidewall of the tire T, he merely observes the reading on display 34 and enters that position in one of a plurality of radial position switches 35 located on the control panel. Then, if testing at other radial locations is desired, motor 14 is again activated and another number set into another of switches 35. Any number of switches 35 can be provided depending on the number of different sidewall areas desired to be tested. Usually for a passenger size tire, two radial test positions are sufficient.

The desired radial positions set into switches 35 are fed to a microcomputer 36 and a radial drive interface circuit 38. A microcomputer such as Model No. OCM-1/F8 purchasable from the Instrumentation and Controls Division of Fairchild Camera and Instruments Corp., San Jose, Calif. and programmed in accordance with the instruction manual to perform the functions ascribed herein, has been found suitable. Such programming and the use of other equivalent microcomputers would be well within the knowledge of one skilled in the art and will not be detailed herein. Similarly, the skilled artesian would readily be able to design a suitable interface ciruit 38 dependent on the particular microcomputer selected. Microcomputer 36 is also suitably interfaced with the TUO/TUG machine so that the operation of the device 10 described herein is appropriately timed with the other operating functions of the TUO/TUG machine.

Thus, the numbers from switches 35 are fed to microcomputer 36 and, at an appropriate time in the operating cycle of the TUO/TUG machine, are loaded into interface circuit 38. Motor control 32 is then directed to operate motor 14 until the first position set in switches 35 is reached. Later, after the test cycle is completed, motor 14 will be activated to move to the second radial position and so on until all the desired positions have been tested. Limit switches 39 can be provided, particularly for use during manual operation, to stop motor 14, through motor control 32 and interface 38, should operation be attempted at an inappropriate time, such as when components of the TUO/TUG machine may not be cleared out of the way.

The lateral position control subsystem is indicated generally by the numeral 40 and includes lateral stepping motors 22 and 23 previously described. Motors carrying Model No. M061-FD08 of Superior Electric Co., Bristol, Conn., have been found suitable for use in this regard. Motors 22 and 23 are controlled by lateral motor control circuits 41 and 42, respectively, which can be devices known in the art as translators such as a Model No. STM-153 manufactured by Superior Electric Co., Bristol, Conn. Once the probes 29 and 30 are in the proper radial position, as just described, control circuits 41 and 42 operate motors 22 and 23, respectively, under instructions from microcomputer 36 through lateral drive interface circuit 43, until the proper lateral position is obtained. Lateral drive interface circuit 43, like radial drive interface circuit 38, is readily designable by the skilled artesian for compatability with microcomputer 36.

The proper lateral position is controlled by feedback from the transducer probes 29 and 30 through interface circuit 43 to motor controls 41 and 42. Basically, depending on the exact transducer probe selected, it will be designed to operate at a specified distance from the sidewall of the tire T. Inherent in its operation is that it provides an output voltage signal proportional to the distance between it and the sidewall of the tire. When the interface circuit 43 receives signals from transducer probes 29 and 30 proportional to the designed operational distance of the transducers, it directs motor control 41 to stop motors 22 and 23. Finally, as in the case of radial position control subsystem 31, lateral position control subsystem 40 is provided with limit switches 44 which can direct interface 43 to stop motors 22 and 23 should the probes, for some reason travel too far in either direction.

The last control subsystem is the probe angle drive subsystem indicated generally by the numeral 45 and including probe angle stepping motors 26 and 28 previously described. Motors carrying Model No. K82401-Pl manufactured by North American Phillips Control Corp., Cheshire, Conn. have been found suitable for use in this regard. When initially setting up device 10 for test runs on a particular size tire, and after the operator has established the desired radial position as previously described, probes 29 and 30 must be rotated so that the axes thereof are approximately normal to a plane passing tangent through a point on the sidewall of the tire.

Motors 26 and 28 are controlled by microcomputer 36 through a probe angle drive interface circuit 46, the design of which would be readily apparent to one skilled in the art. To set the initial conditions for motors 26 and 28, the operator manually runs motors 26 and 28 with the displacement thereof being counted by current probe angle position counter 48 through interface circuit 46 and displayed on the control panel by current probe angle position display 49. When the transducer probes are properly positioned as previously described, the operator observes the count displayed by current probe angle position display 49 and sets that number into one set of a plurality of probe angle position switches 50 located on the control panel. Then if multiple positions on the sidewall are to be tested, the operator moves transducer probes 29 and 30 to the second radial position and repeats the process setting the second angular position into another set of switches 50. Again, limit switches 51 and 52 are provided to prevent any damage to probes 29 and 30, respectively, due to an accidental overtravel thereof.

During automatic operation of the device just described, when microcomputer 36 determines that the tire is mounted, inflated and rotating on the TUO/TUG machine, radial motor control 32 is directed through interface 38 to move carriage 13 to the first position set into radial position switches 35. Then, the probes are rotated to the first position set into probe angle position switches 50 and finally lateral motor controls 41 and 42 move arms 21 toward the tire until such time that feedback from transducers 29 and 30 indicates that the transducers are in operating position. Readings are then taken on the rotating tire. If two or more test positions are desired, after the first test, radial motor 14 moves to the second position and the procedure is repeated.

As previously described, the output of transducers 29 and 30 is a voltage signal proportional to the distance between the transducer and the sidewall of the tire T. In other words, it is a signal proportional to the contour of the tire as it is being rotated. These output signals are fed to a signal processor circuit indicated generally by the numeral 60 in FIG. 2. One form of signal processor is shown in FIG. 3, it being understood that there are two identical channels, one for each transducer, with only one channel being shown in FIG. 3 with reference to transducer 30.

The signal from transducer 30 is fed to a differentiator 61 which is of a conventional electronic configuration the output signal of which is the differential of its input, that is, the rate of change of voltage (position) with respect to time. Thus, for a tire having a perfectly planar sidewall contour, the signal out of differentiator 61 would always be zero. As a practical matter, however, there will almost always be some rate of change signal from differentiator 61 which signal is fed to a window or absolute value comparator 62. Window comparator 62 compares the signal from differentiator 61 with preselected levels set therein indicative of the maximum tolerable rates of change of position. When those levels are exceeded, comparator 62 provides an output signal. For example, if it were determined that anything exceeding a ±5 volt signal was indicative of a deformity of intolerable size (the sign being indicative of whether the deformity was a bulge or depression) whenever the signal from differentiator exceeded ±5 volts, comparator 62 would provide an output. This output signal is received by a timer circuit 63 which effectively times the period it is receiving the comparator signal. A predetermined time period is set into timer 63 and if that predetermined time is exceeded, timer 63 will time out providing a signal to an AND gate 64. The second input to AND gate 64 is merely an enable signal which is present wherever a test is being conducted. This signal could be provided by a switch on the control panel or by microcomputer 36. Thus, if during a test cycle a signal is received from timer 63, AND gate 64 provides a signal to an indicator which could be an audible alarm or a light on the control panel to indicate a problem tire.

The purpose of timer 63 is so that naturally occurring and unobjectionable deformities, such as pin vents or the like, which occur over a very short circumferential distance but with a large height, are ignored. In other words, an ignorable pin vent deformity would cause a large output from differentiator 61 but for a short duration. The output would be large enough to trigger comparator 62 but only for a short period of time—not long enough for timer 63 to time out. Therefore these types of unobjectionable deformities would not be indicated. But objectionable deformities which exceed a predetermined extent for a predetermined time period would be indicated.

Figure 3:
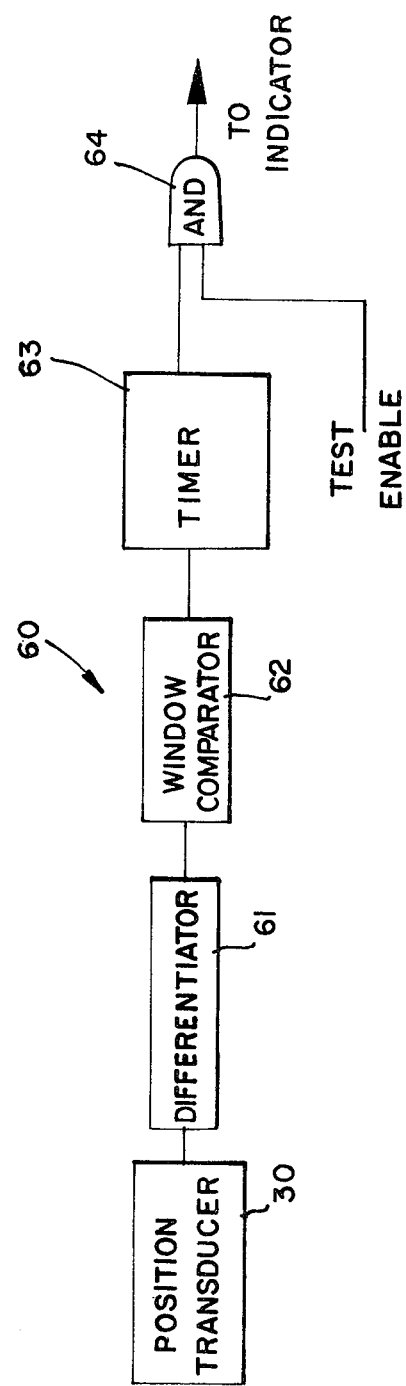
FIG. 3 is a block-schematic diagram of one embodiment of a signal processing circuit shown in block form in FIG. 2.

The circuit of FIG. 3 will thus detect sidewall deformities of predetermined magnitude and extent. However, according to common practices, many tires have raised letters on the sidewall. If such letters were of sufficient magnitude and extent, the circuit of FIG. 3 would falsely indicate a deformity. Thus, while utilizing the FIG. 3 circuit it would be recommended to position the transducers at locations on the sidewall other than where letters appear. If it were desired to test the area of the sidewall having letters, the circuit of FIG. 4 could be utilized.

Figure 4:
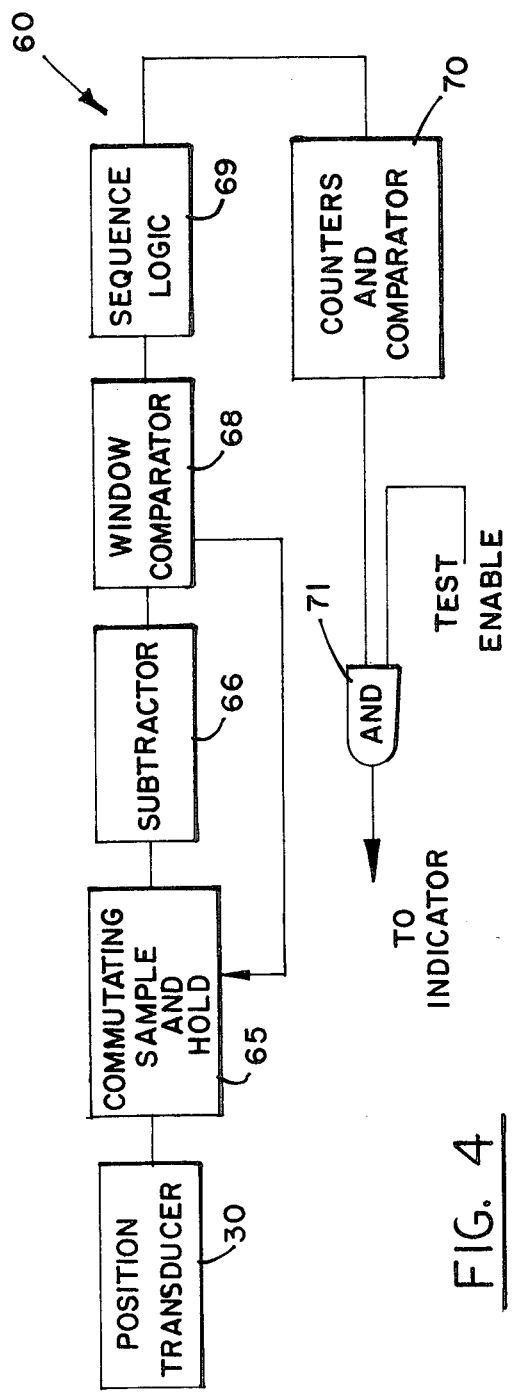
FIG. 4 is a block-schematic diagram of an alternate embodiment of a signal processing circuit shown in block form in FIG. 2.

FIG. 4 depicts an alternate signal processing circuit 60 which can be used to discriminate between deformities, that is, recognize letters and the like as nondeformities should a test run be desired over a sidewall area having such letters. As in the FIG. 3 circuit, it is to be understood that a two channel system would be employed, one for each transducer 29 and 30. FIG. 4 depicts a signal processing circuit 60 as used with transducer 30 which provides the output signal proportional to the contour of the sidewall. This signal is provided to a commutating sample and hold circuit 65. A sample and hold circuit, as is well known in the art, periodically samples its input signal and holds the same for further processing. In actuality, circuit 65 includes two sample and hold networks alternatingly sampling segments of the transducer signal. As the tire begins moving, the first sample and hold network records and holds the signal from transducer 30, which can be called X1, and then the second sample and hold network records and holds the signal from transducer 30, X2, for the second sampling period. The two sample signals currently being held by circuit 65 are fed to a conventional subtractor 66 whose output signal is the difference between its inputs, that is, X1-X2. In effect then, the output of subtractor 66 is a differentiated input signal just like the output of differentiator 61 in the FIG. 3 embodiment.

This output of subtractor 66 is fed to a window or absolute value comparator 68 which, like comparator 62 in FIG. 3, compares the signal from subtractor 66 with preselected levels set therein indicative of the maximum tolerable rate of change of position. If either the positive tolerable rate or the negative tolerable rate is exceeded, a signal indicative of such is sent to a sequence logic circuit 69. Included within sequence logic circuit 69 is a clock which provides a switching signal to sample and hold circuit 65. The clock signal effectively sequentially switches the sample and hold networks within circuit 65 such that after the X1-X2 signal is calculated, a new position period is sampled and an X3-X2 signal fed to comparator 68. This is followed by an X3-X4 signal and so on through the test cycle. Because the signal from one of the sample and hold networks is continually fed to the summing or positive junction of subtractor 66 and the other to the subtracting or negative junction of subtractor 66, consecutive signals to comparator 68 would be of different polarities even though the samples positions are of the same polarity. Thus, if X1 were, for example, +5 volts, X2 +10 volts and X3+15 volts, indicative of a constant and uniform position change in the sidewall of the tire, the first signal to comparator, X1-X2, would be −5 volts with the second signal, X3-X2, +5 volts. If comparator 68 were set at or below the ±5 volt level indicative of a deformity to be detected, a signal accordingly would be fed to sequence logic circuit 69. A series of logic gates in sequence logic circuit 69 recognizes that consecutive signals of opposite polarity are really indicative of a consistantly increasing (or decreasing) position signal and upon each such occurrence circuit 69 provides an output signal to a counter and comparator circuit 70.

Circuit 70 in its basic form acts like timer 63 of the FIG. 3 embodiment and includes two counters, one counting signals which logic circuit 69 has recognized as positive slope signals and the other counting signals which logic circuit 69 has recognized as negative slope signals. When a positive count is received, the negative counter is reset to zero and when a negative count is received, the positive counter is reset. Each signal received from sequence logic circuit 69 is counted by the particular counter and when a predetermined count is reached, indicative that a deformity of predetermined extent has existed for a predetermined time, a comparator within circuit 70 sends a signal to an AND gate 71 which, if in an enabled mode as described in conjunction with the embodiment of FIG. 3, provides a signal to an indicator to alert the operator of the tire having the deformity. If desired, the information from sequence logic circuit 69 can be provided to microcomputer 36 which would be programmed to recognize that certain combination of signals represents certain patterns corresponding to letters or the like on a sidewall and the action of counter and comparator circuit 70 would be replaced so that false alarm signals would not be given. Or, a plurality of comparators 68 and a plurality of counters 70 could be provided with certain combinations thereof being set to recognize letters or the like.

It should thus be evident that a device constructed according to the concept of the present invention will accomplish the objects of the invention and otherwise substantially improve quality control in the tire manufacturing art.

I claim:

1. Apparatus to detect irregularities in the sidewall of a rotatable tire comprising transducer means monitoring the contour of the sidewall of the tire and providing an output signal proportional thereto, means to position said transducer means adjacent the sidewall of the tire, signal processing means receiving the output of said transducer means and providing an output signal when an irregularity of a predetermined contour is detected by said transducer means, and means receiving the output of said signal processing means to indicate a tire having an irregularity of a predetermined contour.

2. Apparatus according to claim 1 wherein said means to position includes radial position means to locate said transducer means at a desired position radially of the tire.

3. Apparatus according to claim 2 wherein said radial position means includes means to position said transducer means at a plurality of predetermined radial locations along the sidewall of the tire.

4. Apparatus according to claim 2 wherein said radial position means includes a motor, means to operate the motor to move said transducer means a predetermined distance, counter means to record the movement of said transducer means, and means to display the distance moved by said transducer means.

5. Apparatus according to claims 1 or 2 wherein said means to position includes transducer angle position means to locate said transducer means approximately normal to the sidewall of the tire.

6. Apparatus according to claim 5 wherein said transducer angle position means includes means to position said transducer means at a plurality of predetermined angular positions.

7. Apparatus according to claim 5 wherein said transducer angle position means includes motor means to angularly rotate said transducer means, means to operate said motor means to move said transducer means a predetermined distance, counter means to record the degree of movement of said transducer means, and means to display the distance moved by said transducer means.

8. Apparatus according to claims 1 or 2 wherein said means to position includes lateral position means to locate said transducer means at a desired position laterally of the tire.

9. Apparatus according to claim 8 wherein said means to position includes transducer angle position means to locate said transducer means approximately normal to the sidewall of the tire.

10. Apparatus according to claim 8 wherein said lateral position means includes motor means to move said transducer means laterally of the tire and means to operate said motor means to move said transducer means a predetermined distance, said means to operate said motor means receiving the output of said transducer means.

11. Apparatus according to claim 1 wherein said transducer means includes two non-contact probes, one for each sidewall of the tire.

12. Apparatus according to claim 1 wherein said signal processing means provides an output signal indicative of an irregularity in the contour of the sidewall of the tire when an irregularity of a predetermined extent exists for a predetermined time period.

13. Apparatus according to claim 1 wherein said signal processing means includes differentiator means receiving the output signal of said transducer means and providing an output signal proportional to the differential thereof, comparator means receiving the output signal of said differentiator means and comparing that signal with a predetermined signal proportional to the maximum tolerable irregularity in the sidewall to provide an output signal upon a match thereof, and timing means receiving the output signal of said comparator means and providing an output signal after a predetermined time delay.

14. Apparatus according to claim 1 wherein said signal processing means includes sample and hold circuit means receiving the output signal of said transducer means and storing successive samples thereof to provide output signals proportional thereto, subtractor means receiving the output signals of said sample and hold circuit means representative of two successive samples of the output of said transducer means and providing an output signal representative of the difference between the successive samples, comparator means receiving the output signal of said subtractor means and comparing that signal with a predetermined signal proportional to the maximum tolerable irregularity in the sidewall to provide an output signal upon a match thereof, and circuit means receiving the output signal of said comparator means and providing an output signal after a predetermined time delay.

15. Apparatus according to claim 14 wherein said circuit means includes clock means directing said sample and hold circuit means to alternatingly store the last two successive samples of the output signals of said transducer means, logic means to determine whether successive signals from said comparator means are indicative of a continuous irregularity in the sidewall of the tire and providing an output signal accordingly, counter means receiving the output of said logic means and counting the same to provide an output signal proportional to the count, and comparator means receiving the output signal of said counter means and comparing that signal with a predetermined signal to provide the output signal of said signal processing means.

16. Apparatus to detect irregularities in the sidewall of a rotatable tire comprising transducer means monitoring the contour of the sidewall of the tire and providing an output signal proportional thereto, and circuit means receiving the output of said transducer means and providing an output signal when an irregularity of a predetermined extent exists for a predetermined time period.

17. Apparatus according to claim 16 wherein said circuit means includes differentiator means receiving the output signal of said transducer means and providing an output signal proportional to the differential thereof, comparator means receiving the output signal of said differentiator means and comparing that signal with a predetermined signal proportional to the maximum tolerable irregularity in the sidewall to provide an output signal upon a match thereof, and timing means receiving the output signal of said comparator means and providing an output signal after a predetermined time delay.

18. Apparatus according to claim 16 wherein said circuit means includes sample and hold circuit means receiving the output signal of said transducer means and storing successive samples thereof to provide output signals proportional thereto, subtractor means receiving the output signals of said sample and hold circuit means representative of two successive samples of the output of said transducer means and providing an output signal representative of the difference between the successive samples, comparator means receiving the output signal of said subtractor means and comparing that signal with a predetermined signal proportional to the maximum tolerable irregularity in the sidewall to provide an output signal upon a match thereof, clock means directing said sample and hold circuit means to alternatingly store the last two successive samples of the output signals of said transducer means, logic means to determine whether successive signals from said comparator means are indicative of a continuous irregularity in the sidewall of the tire and providing an output signal accordingly, counter means receiving the output of said logic means and counting the same to provide an output signal proportional to the count, and comparator means receiving the output signal of said counter means and comparing that signal with a predetermined signal to provide the output signal of said signal processing means.

19. A method of detecting irregularities in the contour of the sidewall of a tire comprising the steps of placing a transducer adjacent the sidewall of the tire, rotating the tire, determining from the transducer a change in contour of the sidewall of the tire, determining the rate of change in contour of the sidewall of the tire, comparing the determined rate of change with a preselected rate of change, and timing the period that the determined rate of change exceeds the preselected rate of change for a preselected time to detect an irregularity of a predetermined size and extent in the contour of the sidewall of the tire.

* * * * *

Disclaimer 4,258,567.—*Thomas W. Fisher, III,* Akron, Ohio. TIRE SIDEWALL DEFORMITY TESTER AND METHOD. Patent dated Mar. 31, 1981. Disclaimer filed Feb. 10, 1986, by the assignee, *The Firestone Tire & Rubber Co.*

Hereby enters this disclaimer to claims 1–19 of said patent.
[*Official Gazette May 27, 1986.*]